United States Patent
Mori

(10) Patent No.: US 7,599,574 B2
(45) Date of Patent: Oct. 6, 2009

(54) SIGNAL PROCESSING APPARATUS, SIGNAL PROCESSING METHOD, CORRECTION VALUE GENERATION APPARATUS, CORRECTION VALUE GENERATION METHOD, AND DISPLAY APPARATUS MANUFACTURING METHOD

(75) Inventor: Tetsuzo Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 805 days.

(21) Appl. No.: 10/844,483

(22) Filed: May 13, 2004

(65) Prior Publication Data

US 2004/0227697 A1  Nov. 18, 2004

(30) Foreign Application Priority Data

May 14, 2003 (JP) ............................. 2003-135388
Apr. 28, 2004 (JP) ............................. 2004-133031

(51) Int. Cl.
*G06K 9/40* (2006.01)

(52) U.S. Cl. ...................... 382/274; 349/33; 345/87; 371/31; 375/240.03

(58) Field of Classification Search ................ 382/274
See application file for complete search history.

(56) References Cited

U.S. PATENT DOCUMENTS 5,751,358 A * 5/1998 Suzuki et al. .......... 375/240.04
5,764,209 A * 6/1998 Hawthorne et al. ........... 345/87
5,809,041 A * 9/1998 Shikakura et al. ........... 714/747
6,094,243 A * 7/2000 Yasunishi .................... 349/33
6,229,583 B1 * 5/2001 Yasunishi .................... 349/33
6,389,073 B1 * 5/2002 Kurobe et al. .......... 375/240.03
2003/0147463 A1* 8/2003 Sato et al. ............. 375/240.05
2003/0202582 A1* 10/2003 Satoh .................... 375/240.03

FOREIGN PATENT DOCUMENTS

| JP | 02122766 A * 5/1990 |
| JP | 7-181911 7/1995 |
| JP | 9-251276 9/1997 |
| JP | 10-31450 2/1998 |
| JP | 10247247 A * 9/1998 |
| JP | 2002-174564 6/2002 |

* cited by examiner

*Primary Examiner*—Bhavesh M Mehta
*Assistant Examiner*—Tsung-Yin Tsai
(74) *Attorney, Agent, or Firm*—Fitzpatrick, Cella, Harper & Scinto

(57) ABSTRACT

A signal processing apparatus supplied with a signal obtained by performing orthogonal transform on a video signal corresponding to a plurality of pixels includes a correction circuit for correcting the orthogonal-transformed signal, by using correction values obtained by performing orthogonal transform equivalent to the orthogonal transform on measured values obtained by measuring nonuniformity of display characteristics of a display device, which performs display on the basis of a signal processed by the signal processing apparatus. In addition, an inverse orthogonal transform device performs inverse orthogonal transform on a signal corrected by the correction circuit and thereby obtains a corrected video signal.

5 Claims, 8 Drawing Sheets

SIGNAL PROCESSING APPARATUS, SIGNAL PROCESSING METHOD, CORRECTION VALUE GENERATION APPARATUS, CORRECTION VALUE GENERATION METHOD, AND DISPLAY APPARATUS MANUFACTURING METHOD

BACKGROUND OF THE INVENTION

1. Field of the Invention

The present invention relates to a signal processing apparatus, a signal processing method, a correction value generation apparatus, a correction value generation method, and a display apparatus manufacturing method that can be used in a display apparatus, such as a liquid crystal display, a plasma display, an EL display or an electron emission display, having a screen formed of a two-dimensional arrangement of a plurality of pixels.

2. Description of the Related Art

In display devices such as the liquid crystal display, plasma display, EL display, and electron emission display, display defects and display unevenness become important elements which determine the products quality.

For quality assurance, therefore, manufacture process management peculiar to respective display devices and tolerance management of members are performed strictly, and nonstandard articles are rejected in the inspection process for finished products.

In the case where such manufacture management is adopted, it is not typical in display apparatuses using display devices that display faults such as display defects or display unevenness are corrected.

On the other hand, methods for correcting display faults are disclosed in Japanese Patent Application Laid-Open (JP-A) Nos. 7-181911, 9-251276 and 10-031450.

Furthermore, in the manufacture process, display devices are subject in display unevenness to quantitative evaluation, and the display devices are classified according to the evaluation values. As for a device having a correctable evaluation value, the defect part is repaired and corrected.

A technique for classifying devices according to the evaluation values is disclosed in JP-A No. 2002-174564. In the technique, wavelet transform processing is adopted for evaluation value calculation.

SUMMARY OF THE INVENTION

An object of the present invention is to implement a configuration capable of improving display faults.

Especially, an object of the present invention is to provide a signal processing apparatus, a signal processing method, a correction value generation apparatus, a correction value generation method, and a display apparatus manufacturing method capable of improving display faults.

In accordance with a first aspect of the present invention, there is provided a signal processing apparatus including, an orthogonal transform device for performing orthogonal transform on a video signal corresponding to a plurality of pixels, a correction circuit for correcting the signal transformed by the orthogonal transform device, by using correction values obtained by performing orthogonal transform equivalent to the orthogonal transform on measured values obtained by measuring nonuniformity of display characteristics of a display device, which performs display on the basis of a signal processed by the signal processing apparatus; and an inverse orthogonal transform device for performing inverse orthogonal transform on a signal corrected by the correction circuit and thereby obtaining a corrected video signal.

In accordance with a second aspect of the present invention, there is provided a signal processing apparatus supplied with a signal obtained by performing orthogonal transform on a video signal corresponding to a plurality of pixels, the signal processing apparatus including a correction circuit for correcting the orthogonal-transformed signal, by using correction values obtained by performing orthogonal transform equivalent to the orthogonal transform on measured values obtained by measuring nonuniformity of display characteristics of a display device, which performs display on the basis of a signal processed by the signal processing apparatus, and an inverse orthogonal transform device for performing inverse orthogonal transform on a signal corrected by the correction circuit and thereby obtaining a corrected video signal.

In accordance with a third aspect of the present invention, the input orthogonal-transformed signal is a signal transmitted from a transmitting subject of the signal in a state in which the signal has been subjected to orthogonal transform, or a signal readout from a medium for recording the signal in a state in which the signal has been subjected to orthogonal transform.

In the above described-aspects, correction can also be performed by using values obtained by adjusting the correction values. Specifically, correction can be performed by using values obtained by adjusting the correction values on the basis of the magnitude of a DC component of a signal to be corrected and/or the magnitude of a DC component of the correction values. Furthermore, a configuration allowing selection whether to perform the adjustment may be preferably adopted.

The statement that the orthogonal transform on the signal obtained by performing orthogonal transform on a video signal is equivalent to the orthogonal transform performed on measured values obtained by measuring the nonuniformity of the display characteristics means that the signal transformed by the former-cited orthogonal transform is in such a relation that it can be suitably corrected by or using correction values obtained by the latter-cited orthogonal transform. For example, if the former-cited orthogonal transform is the discrete wavelet transform and the latter-cited orthogonal transform is the discrete cosine transform, then suitable correction cannot be performed as it is. Therefore, they are not the equivalent transforms referred to herein.

In accordance with a fourth aspect of the present invention, there is provided a signal processing method for processing a signal obtained by performing orthogonal transform on a video signal corresponding to a plurality of pixels, the signal processing method including a correction process for correcting the orthogonal-transformed signal, by using correction values obtained by performing orthogonal transform equivalent to the orthogonal transform on measured values obtained by measuring nonuniformity of display characteristics of a display device, which performs display on the basis of a signal processed by using the signal processing method, and an inverse orthogonal transform process for performing inverse orthogonal transform on a signal corrected in the correction process and thereby obtaining a corrected video signal.

In accordance with a fifth aspect of the present invention, if the input signal is not a signal obtained by performing orthogonal transform, the signal processing method may further include a process for performing orthogonal transform on the video signal corresponding to the pixels.

In accordance with a sixth aspect of the present invention, there is provided a correction value generation apparatus for generating correction values in order to correct a signal obtained by performing orthogonal transform on a video signal corresponding to a plurality of pixels, so as to be capable of suppressing nonuniformity in display characteristics of a display apparatus, the correction value generation apparatus including a detector for detecting a display state of the display apparatus for a test video signal input thereto, an orthogonal transform device for performing orthogonal transform equivalent to the orthogonal transform on a detected signal obtained from the detector for the test video signal, and a circuit for generating correction values in order to suppress nonuniformity in the display characteristics on the basis of an output of the orthogonal transform device.

In accordance with a seventh aspect of the present invention, there is provided a correction value generation method for generating correction values in order to correct a signal obtained by performing orthogonal transform on a video signal corresponding to a plurality of pixels, so as to be capable of suppressing nonuniformity in display characteristics of a display apparatus, the correction value generation method including a detection process for detecting a display state of the display apparatus for a test video signal input thereto, an orthogonal transform process for performing orthogonal transform equivalent to the orthogonal transform on a detected signal obtained from the detection process for the test video signal, and a process for generating correction values in order to suppress nonuniformity in the display characteristics on the basis of a result of the orthogonal transform process.

In accordance with an eighth aspect of the present invention, there is also provided a manufacture method of a display apparatus by using the correction value generation method. Specifically, the manufacture method includes preparing a display apparatus so as to be capable of bringing the display apparatus into a display state, executing the correction value generation method, storing obtained correction values in a storage device, and thereby manufacturing the display apparatus.

DETAILED DESCRIPTION OF THE PREFERRED EMBODIMENTS

Figure 1:
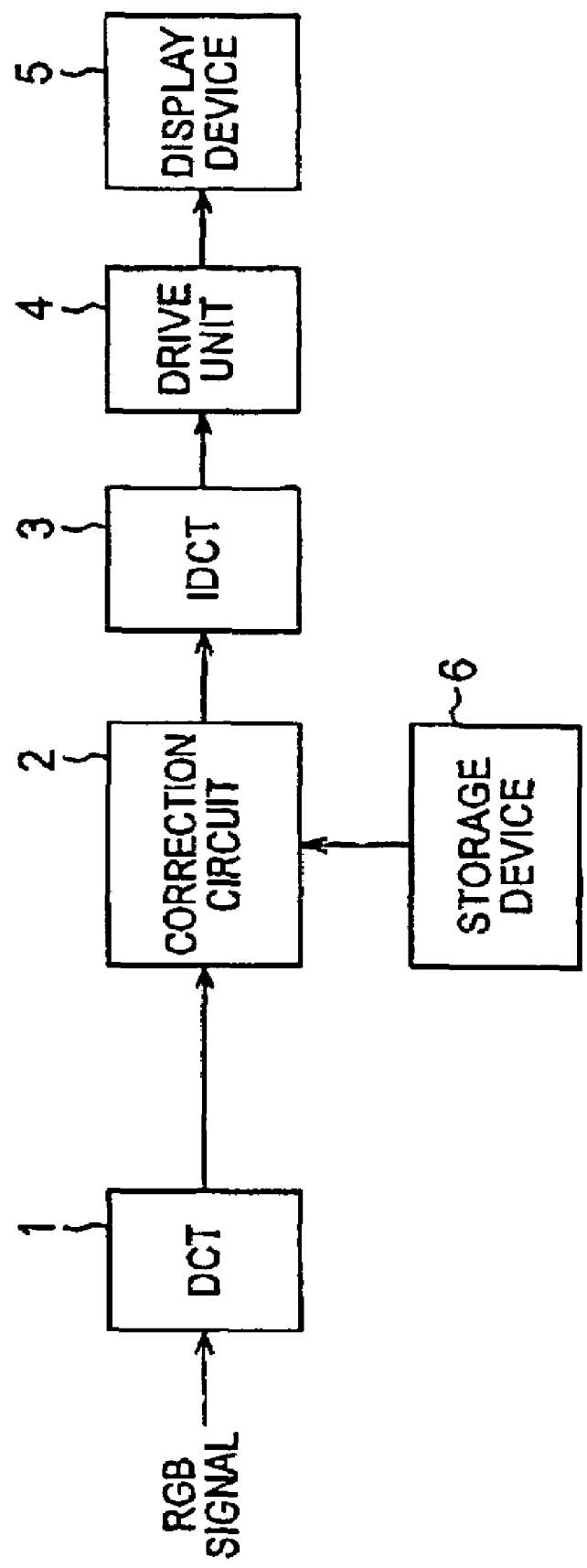
FIG. 1 is a block diagram showing a display apparatus according to a first embodiment.

Hereafter, preferred embodiments of the present invention will be described.

First, a display panel is fabricated and prepared by using a well known method. The display panel is the so-called fixed pixel display device, such as a liquid crystal display panel, an inorganic EL display panel, an organic EL display panel, a plasma display panel or an electron emission display panel, having a large number of pixels arranged in a two-dimensional form to form a screen. A well-known drive circuit and a signal processing circuit for generating a video signal to be supplied to the drive circuit are mounted on the display panel. Even if a drive signal having the same luminance level (gradation level) obtained from the video signal is input to every pixel, the display luminance level of each pixel on the display panel thus obtained does not necessarily become constant because of the manufacture dispersion or the like. In other words, the display panel has a nonuniformity in the display characteristics. Especially as for periodic nonuniformity, it can be suppressed by the same correction processing For example, therefore, a video signal having the same luminance level such as a signal that makes all pixels uniformly luminous with a predetermined luminance level is supplied to all pixels via a drive circuit as a test video signal. Nonuniformity in display characteristics caused by the test video signal is detected by picking up display luminance obtained from the display panel with image pickup elements or detecting currents flowing through pixels on the display panel. As a result, nonuniformity in brightness caused by dispersion in characteristics of display elements for forming pixels of the display panel, or nonuniformity in brightness caused by a structure other than display elements, such as an atmosphere resistance spacer, in the electron emission display panel is detected as a luminance or current value corresponding to each pixel. This detection result is stored as a detection signal level corresponding to a pixel position. By conducting orthogonal transform on the detection signal corresponding to the pixel space, a correction signal, in which brightness distribution corresponding to the pixel space is represented as coefficients respectively of functions serving as orthogonal transform bases, is generated. In other words, orthogonal transform processing such as discrete cosine transform or discrete wavelet transform is conducted on the detection result to transform the detection signal, which before the transform indicates directly or indirectly brightness distribution of each pixel, into intensity distribution of each base function. Coefficients of base functions thus obtained are used as correction values. The correction values are stored in a storage device in a signal processing circuit.

Thus, by using the correction value generation apparatus and method, it is possible to generate correction values (information of nonuniformity of display characteristics on display panel) to be used when conducting correction in the orthogonal transformed state (for example, a frequency space in the case where the discrete cosine transform is used as the orthogonal transform).

After the correction values obtained by using the test video signal have been stored, the input video signal is corrected in the orthogonal transformed state by using a method in one of first to fourth embodiments described later, and the video signal of each pixel corrected in nonuniformity of display characteristics (corrected video signal) is restored by inverse orthogonal transform. Even in a display panel in which display nonuniformity occurs, the nonuniformity can be suppressed by supplying a drive signal corresponding to the corrected video signal thus obtained to each pixel. By the way, it is preferable to make the nonuniformity equal to zero. However, it is not always necessary, but it is sufficient that nonuniformity is suppressed.

The orthogonal transform may be conducted on video signals for all effective pixels forming the display device, or may be conducted every one or more horizontal lines or every two-dimensional pixel group formed of a predetermined matrix. When receiving a signal transmitted in the orthogonal transformed state as described later or reading out a signal from a medium having an orthogonal transformed signal recorded thereon, and conducting the correction for suppressing the display nonuniformity on the signal, correction values should be obtained previously by conducting orthogonal transform equivalent to the orthogonal transform that the transmitted signal or the signal read out has been subjected, on a detection signal indicating the brightness distribution every pixel.

The present invention can be provided in various forms such as software, hardware, or an IP using a hardware description language.

Hereafter, preferred embodiments of the present invention will be described in detail as examples with reference to the drawings.

First Embodiment

In a first embodiment, a display apparatus includes a DCT (discrete cosine transform) circuit as a circuit (orthogonal transform device) for conducting orthogonal transform in order to correct display faults (nonuniformity in display characteristics) such as display defects or display unevenness in a spatial frequency domain, and an IDCT (inverse discrete cosine transform) circuit as a circuit (inverse orthogonal transform device) for conducting inverse orthogonal transform.

FIG. 1 is a configuration diagram of a display apparatus according to the first embodiment. Hereafter, configurations of units shown in FIG. 1 will be described.

Numeral 1 denotes a DCT unit (orthogonal transform device) for transforming a video signal to a spatial frequency signal, i.e., a signal containing intensities respectively of functions serving as bases (cosine waves of respective orders serving as bases) by using the discrete cosine transform. Numeral 2 denotes a correction circuit for correcting display faults such as display defects and display unevenness. Numeral 3 denotes an IDCT unit (inverse orthogonal transform device) for restoring a spatial frequency of a video signal obtained after correction to a video signal by using inverse discrete cosine transform. Numeral 4 denotes a drive unit for driving pixels of a display device 5. Numeral 5 denotes a display device in which each pixel includes a cold cathode element of surface conduction type, a cold cathode element of nano-carbon fiber or a light emitting element having an organic light emission layer. Numeral 6 denotes a storage device for storing a correction value having predetermined components in order to suppress nonuniformity in display characteristics and correct display faults such as display effects or display unevenness.

Hereafter, operation of the display apparatus according to the first embodiment will be described with reference to FIGS. 1, 2 and 3A to 3F.

In FIG. 1, an input video signal (for example, color signals respectively of R, G and B) having information to be displayed on the display apparatus is input to the DCT unit 1. The DCT unit I conducts discrete cosine transform on the input video signal and outputs ante-correction spatial frequency information. The ante-correction spatial frequency information is input to the correction circuit 2, and corrected so as to be canceled in display faults such as display defects and display unevenness. Post-correction spatial frequency information is output. An example of the correction method will be described later. The post-correction spatial frequency information is input to the IDCT unit 3, and subject to inverse discrete cosine transform. A post-correction video signal is output from the IDCT unit 3.

Thereafter, the drive unit 4, which is a drive circuit, drives pixels of the display device 5 on the basis of the post-correction video signal. Display is thus performed on the display device 5.

Figure 2:
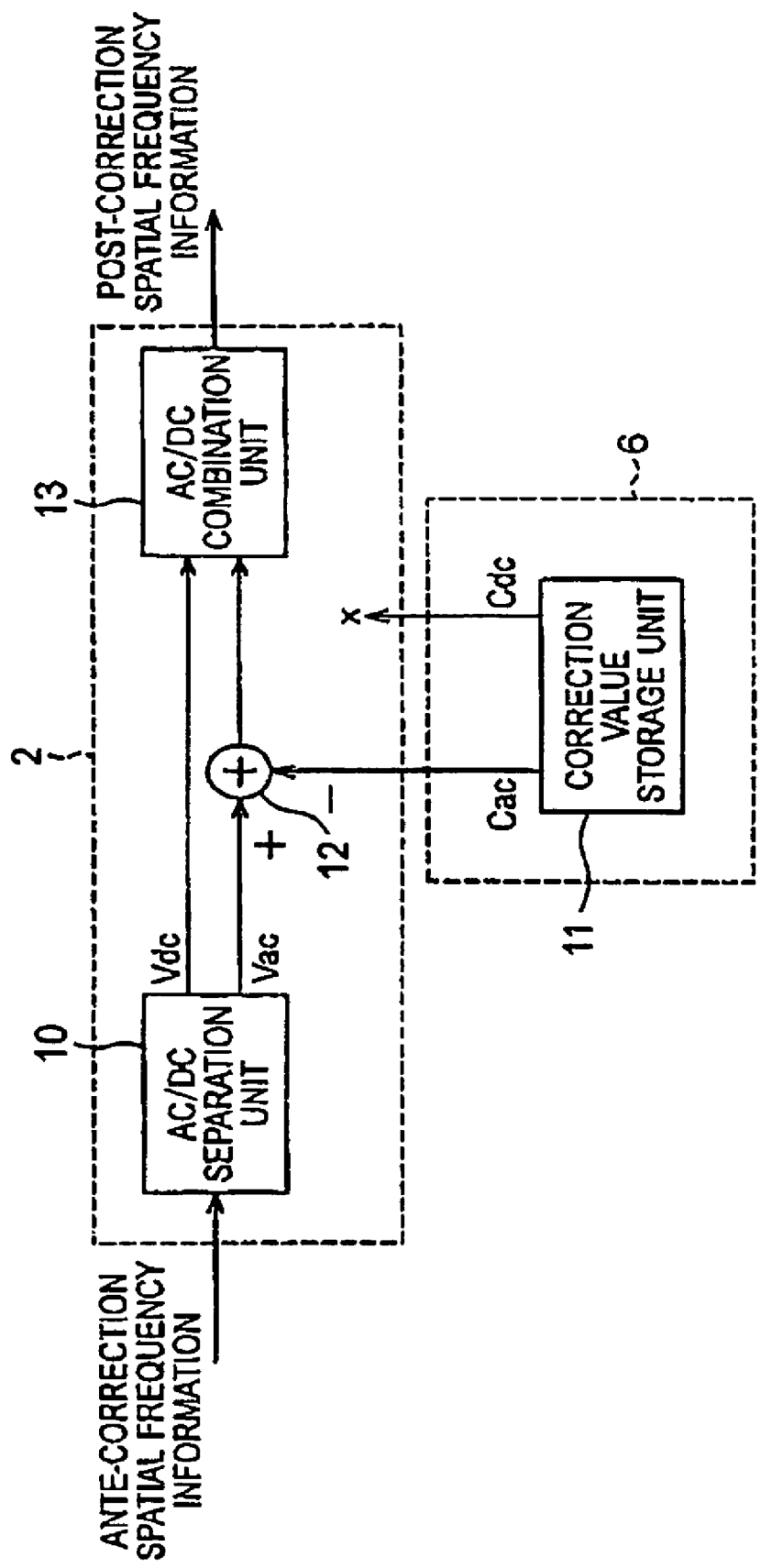
FIG. 2 is a block diagram showing a feature portion in the first embodiment.

The correction method in the present embodiment will be described in detail with reference-to FIG. 2. FIG. 2 is a diagram showing configurations of the correction circuit 2 and the storage device 6 shown in FIG. 1.

In FIG. 2, numeral 10 denotes an AC/DC separation unit for separating an AC component and a DC component of the ante-correction spatial frequency information. Numeral 11 denotes a correction value storage unit for correcting display faults such as display defects and display unevenness. Numeral 12 denotes an adder. Numeral 13 denotes an AC/DC combination unit for combining an AC component and a DC component of the post-correction spatial frequency information.

Here, the AC/DC separation unit 10, the adder 12 and the AC/DC combination unit 13 form the correction circuit 2, and the correction value storage unit 11 forms the storage device 6.

The ante-correction spatial frequency information input to the AC/DC separation unit 10 is a video signal subjected to the discrete cosine transform. The ante-correction spatial frequency information includes the AC component and the DC component.

The ante-correction spatial frequency information is separated into an AC component Vac and a DC component Vdc by the AC/DC separation unit 10. The AC component Vac is sent to the adder 12, and the DC component Vdc is sent to the AC/DC combination unit 13 as it is.

On the other hand, correction spatial frequency information serving as predetermined correction values for representing display fault characteristics such as display defects and display unevenness is previously stored in the correction value storage unit 11. The correction spatial frequency information differs according to an individual of the display device 5, and it is previously obtained in the manufacture process by measuring characteristics of the display device 5 and conducting calculation processing.

The correction spatial frequency information is also separated into an AC component Cac and a DC component Cdc. The AC component Cac is sent to the adder 12. The DC component Cdc is made to disappear on the way.

In the adder 12, the display fault characteristics for the AC component are removed in the spatial frequency domain by calculating "Vac−Cac". After the correction calculation is thus performed, the AC component "Vac−Cac" and the DC component Vdc are combined in the AC/DC Combination unit 13 to form the post-correction spatial frequency information. The post-correction spatial frequency information is sent to the subsequent IDCT unit 3. The flow of subsequent processing becomes that already described with reference to FIG. 1.

How display faults such as display faults such as display defects and display unevenness are corrected will now be described with reference to FIGS. 3A to 3F. FIGS. 3A to 3F show correction of display faults such as display defects and display unevenness in the configuration of the first embodiment.

Figure 3A:
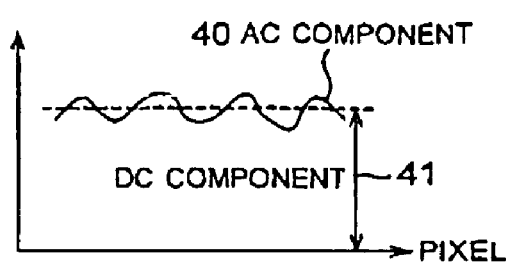
FIGS. 3A to 3F are diagrams showing correction processing conducted in the first embodiment.
Figure 3B:
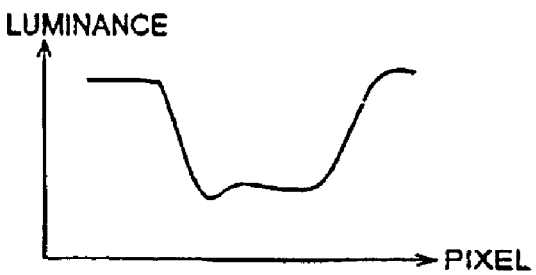
Figure 3C:
Figure 3D:
Figure 3E:
Figure 3F:
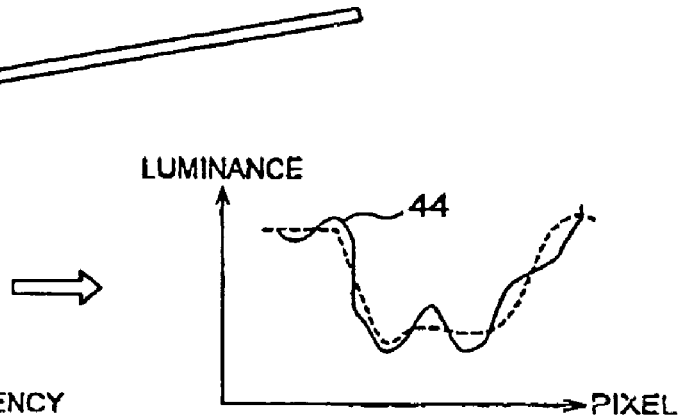

In FIG. 3A to 3F, FIG. 3A shows display fault characteristics of the display device 5 in the image space, FIG. 3B shows the input video signal, FIG. 3C shows a spatial frequency characteristic diagram of a display fault, FIG. 3D shows spatial frequency characteristics of the input video signal, FIG. 3E sows spatial frequency characteristics of the post-correction video signal, and FIG. 3F shows a post-correction video signal in the image space. Numeral 40 denotes an AC component of the display fault characteristics in the image space. Numeral 41 denotes a DC component of the display fault characteristics in the image space. Numeral 42 denotes a DC component of the display fault characteristics in the spatial frequency space. Numeral 43 denotes an AC component of the display fault characteristics in the spatial frequency space. Numeral 44 denotes a post-correction video signal.

In FIG. 3A to 3F, the display fault characteristics of the display device 5 previously measured in the manufacture process shown in FIG. 3A are subjected to discrete cosine transform, and resultant spatial frequency characteristics as shown in FIG. 3C are stored in the correction value storage unit 11.

On the other hand, the input video signal shown in FIG. 3B is also subjected to discrete cosine transform, and ante-correction spatial frequency characteristics as shown in FIG. 3D are obtained.

And since the correction circuit 2 as shown in FIG. 2 conducts correction processing in the spatial frequency domain, post-correction spatial frequency characteristics of the post-correction video signal as shown in FIG. 3E are obtained.

In addition, the post-correction spatial frequency information shown in FIG. 3E is input to the IDCT unit 3, subjected to inverse discrete cosine transform, and inverse-transformed to the pixel space. As a result, the post-correction video signal shown in FIG. 3F is obtained, and correction processing is completed.

As heretofore described with reference to FIGS. 1, 2 and 3A to 3F, the DCT unit 1 for transforming the input video signal to the ante-correction spatial frequency signal, the correction circuit 2 for conducting correction processing on the ante-correction spatial frequency signal in the spatial frequency domain by using the correction values stored in the storage device 6 to correct the display defaults such as display defects and display unevenness, and the IDCT unit 3 for inverse-transforming the post-correction spatial frequency signal to the post-correction video signal are included. By correcting the video signal input to the display device 5, nonuniformity in the display characteristics in the display device 5 having a plurality of pixels can be suppressed and a high quality display apparatus free from display faults such as display defects and display unevenness can be provided. In other words, it becomes possible to correct individually every display device 5 the display fault characteristics that differ every display device 5, and obtain a high picture quality.

Especially in the present embodiment, the correction circuit 2 includes the AC/DC separation unit 10, the adder 12 and the AC/DC combination unit 13. Consequently, correction of the AC component in the display fault characteristics becomes possible.

Second Embodiment

Figure 4:
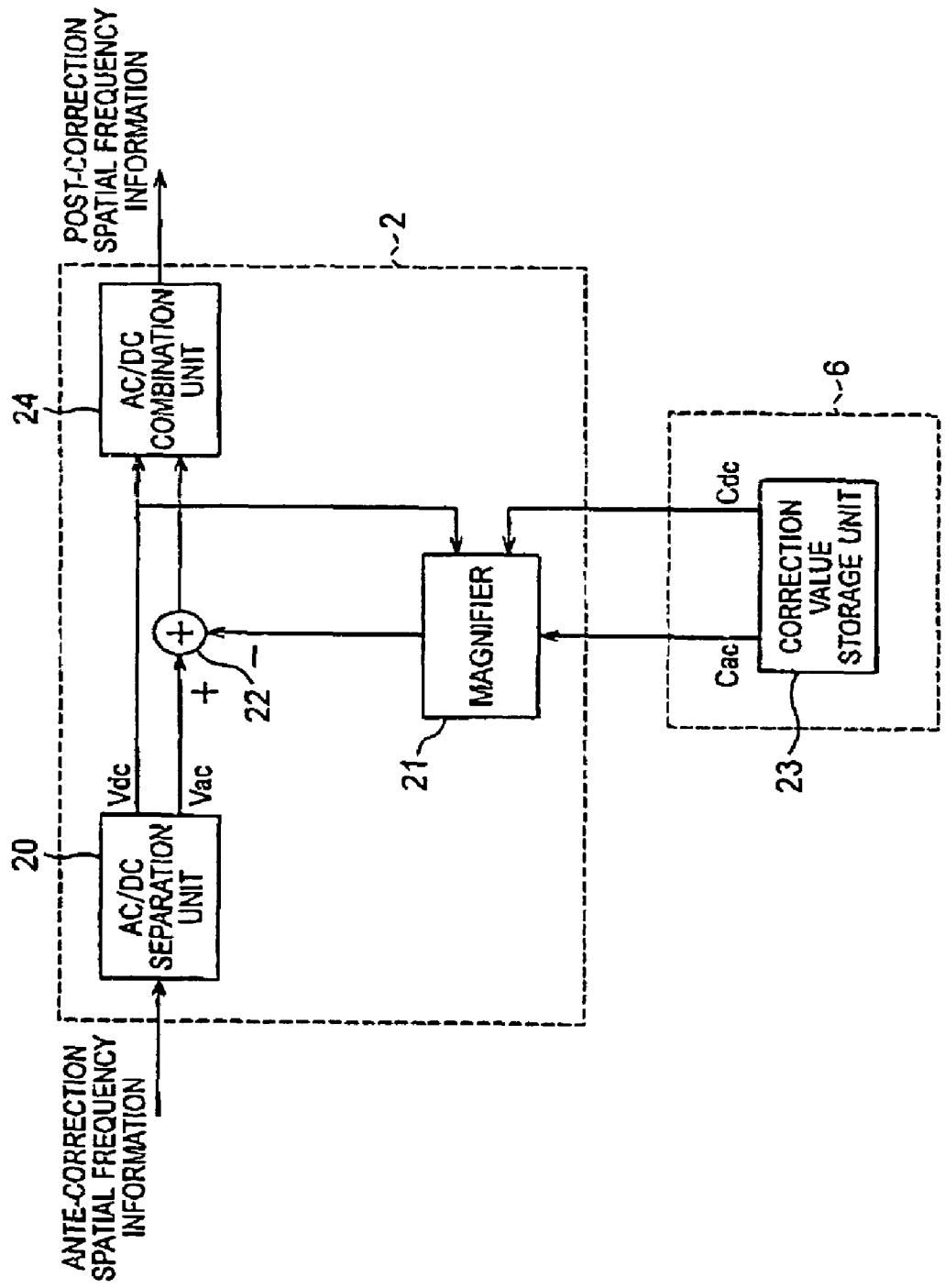
FIG. 4 is a block diagram showing a feature portion in a second embodiment.

FIG. 4 is a configuration diagram of a feature portion of a display apparatus according to a second embodiment. Configurations which are not shown in FIG. 4 are the same as those in the first embodiment.

The second embodiment has a configuration including a magnifier for altering an input magnification of the AC component in the correction value in order to correct the display faults such as display defects and display unevenness in the spatial frequency domain.

In FIG. 4, numeral 20 denotes an AC/DC separation unit for separating an AC component and a DC component of the ante-correction spatial frequency information. Numeral 21 denotes a magnifier for altering an input magnification for the AC component in the correction value. Numeral 22 denotes an adder. Numeral 23 denotes a correction value storage unit for correcting display faults such as display defects and display unevenness. Numeral 24 denotes an AC/DC combination unit for combining an AC component and a DC component of the post-correction spatial frequency information.

Here, the AC/DC separation unit 20, the magnifier 21, the adder 22 and the AC/DC combination unit 24 form the correction circuit 2, and the correction value storage unit 23 forms the storage device 6.

The ante-correction spatial frequency information input to the AC/DC separation unit 20 is a video signal subjected to the discrete cosine transform. The ante-correction spatial frequency information includes the AC component and the DC component.

The ante-correction spatial frequency information, is separated into an AC component Vac and a DC component Vdc by the AC/DC separation unit 20. The AC component Vac is sent to the adder 22, and the DC component Vdc is sent to the AC/DC combination unit 24 and the magnifier 21.

On the other hand, correction spatial frequency information serving as predetermined correction values for representing display fault characteristics such as display defects and display unevenness is previously stored in the correction value storage unit 23. The correction spatial frequency information differs according to an individual of the display device 5, and it is previously obtained in the manufacture process by measuring characteristics of the display device 5 and conducting calculation processing.

The correction spatial frequency information is also separated into an AC component Cac and a DC component Cdc. The AC component Cac and the DC component Cdc are sent to the magnifier 21.

The magnifier 21 calculates a coefficient K serving as the input magnification for the AC component Cac according to "K=Cdc/Vdc" (equation 1).

Subsequently, the magnifier 21 executes calculation "output 1=K×Cac" (equation 2) by using the coefficient K, and supplies the output 1 to the adder 22.

The adder 22 executes calculation "output 2=Vac−output 1=Vac−K×Cac" (equation 3), and supplies the resultant output 2 to the AC/DC combination unit 24.

After the correction calculation is thus performed, the AC component "Vac−K×Cac" and the DC component Vdc are combined in the AC/DC combination unit 24 to form the post-correction spatial frequency information. The post-correction spatial frequency information is sent to the subsequent IDCT unit 3.

As heretofore described with reference to FIG. 4, the magnifier 21 is provided between the correction value storage unit 23 and the adder 22, and consequently the display fault characteristics that the amplitude in the AC characteristics changes according to the luminance level can be corrected.

Third Embodiment

Figure 5:
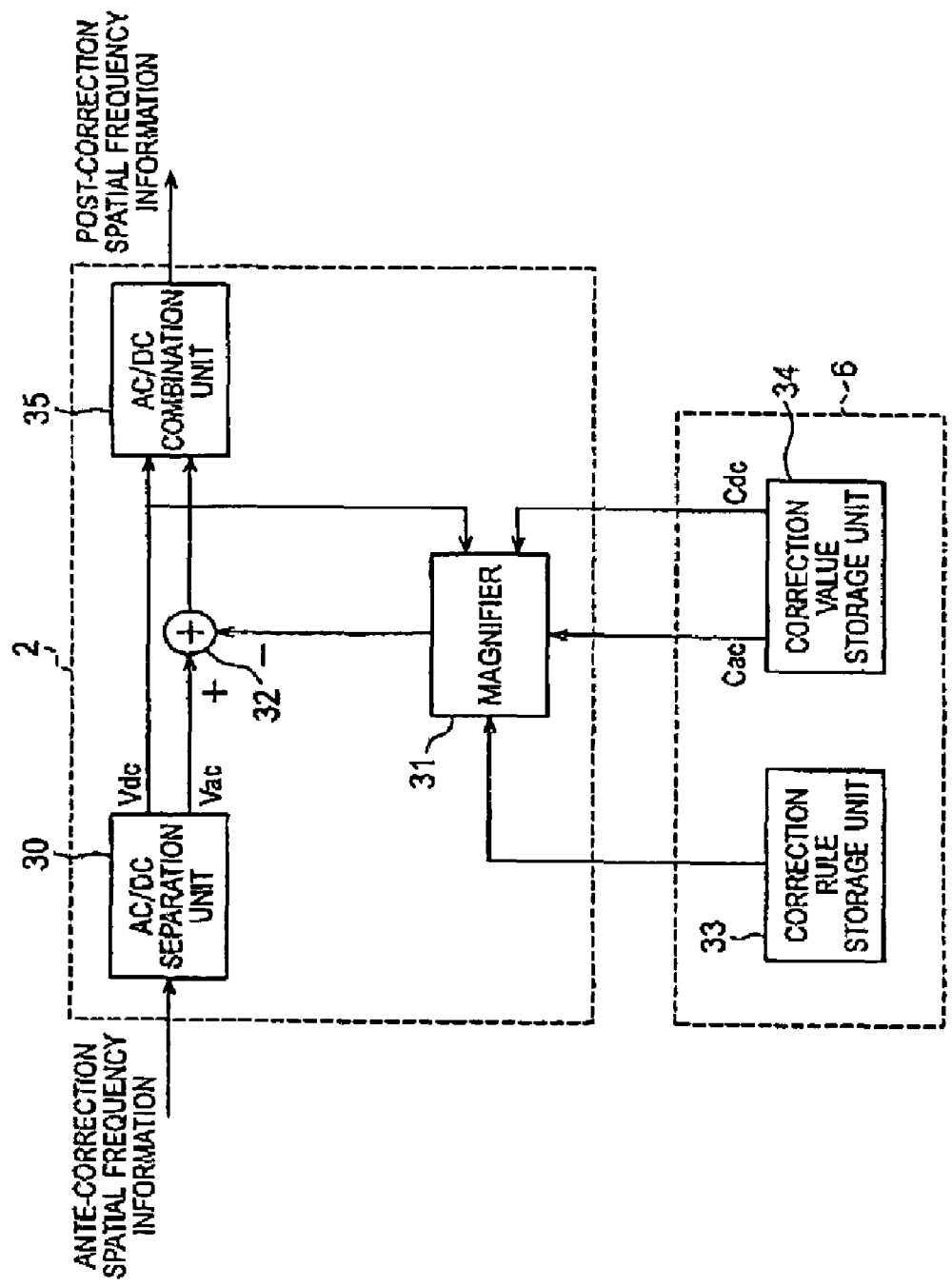
FIG. 5 is a block diagram showing a feature portion in a third embodiment.

FIG. 5 is a configuration diagram of a feature portion of a display apparatus according to a third embodiment. Configurations which are not shown in FIG. 5 are the same as those in the first embodiment.

The third embodiment has a configuration including a magnifier for altering an input magnification of the AC component in the correction value and changing in function according to a rule stored in a correction rule storage unit in order to correct the display faults such as display defects and display unevenness in the spatial frequency domain.

In FIG. 5, numeral 30 denotes an AC/DC separation unit for separating an AC component and a DC component of the ante-correction spatial frequency information. Numeral 31 denotes a magnifier for altering an input magnification for the AC component in the correction value. Numeral 32 denotes an adder. Numeral 33 denotes a correction rule storage unit for controlling the function of the magnifier. Numeral 34 denotes a correction value storage unit for correcting display faults such as display defects and display unevenness. Numeral 35 denotes an AC/DC combination unit for combining an AC component and a DC component of the post-correction spatial frequency information.

Here, the AC/DC separation unit 30, the magnifier 31, the adder 32 and the AC/DC combination unit 35 form the correction circuit 2, the correction rule storage unit 33 and the correction value storage unit 34 forms the storage device 6.

The ante-correction spatial frequency information input to the AC/DC separation unit 30 is a video signal subjected to the discrete cosine transform. The ante-correction spatial frequency information includes the AC component and the DC component.

The ante-correction spatial frequency information is separated into an AC component Vac and a DC component Vdc by the AC/DC separation unit 30. The AC component Vac is sent to the adder 32, and the DC component Vdc is sent to the AC/DC combination unit 35 and the magnifier 31.

On the other hand, correction spatial frequency information serving as predetermined correction values for representing display fault characteristics such as display defects and display unevenness is previously stored in the correction value storage unit 34. The correction spatial frequency information differs according to an individual of the display device 5, and it is previously obtained in the manufacture process by measuring characteristics of the display device 5 and conducting calculation processing.

The correction spatial frequency information is also separated into an AC component Cac and a DC component Cdc. The AC component Cac and the DC component Cdc are sent to the magnifier 31.

Use methods of the correction values are described in the correction rule storage unit 33. In the present embodiment, a rule determines whether the AC component Cac is multiplied by a coefficient K in the magnifier 31.

The magnifier 31 calculates the coefficient K serving as the input magnification for the AC component Cac according to "K=Cdc/Vdc" (equation 4).

Subsequently, the magnifier 31 executes calculation "output 3=K(r)×Cac" (equation 5) by using the coefficient K, and supplies the output 3 to the adder 32.

Here, K(r) is represented as K(r)=K (when r=0) or K(r)=1 (when r=1) (equation 6). The value of r is previously written into the correction rule storage unit 33.

The adder 32 executes calculation "output 4=Vac−K(r)× Cac" (equation 7), and supplies the resultant output 4 to the AC/DC combination unit 35.

After the correction calculation is thus performed, the AC component "Vac−K(r)×Cac" and the DC component Vdc are combined in the AC/DC combination unit 35 to form the post-correction spatial frequency information. The post-correction spatial frequency information is sent to the subsequent IDCT unit 3.

In the present embodiment, the value of r written into the correction rule storage unit 33 is 0 or 1. However, the value of r is not limited to them.

As heretofore described with reference to FIG. 5, the function of magnifier 31 can be controlled by the correction value storage unit 33, and consequently the display fault characteristics can be corrected in both the case where the amplitude of the AC characteristics does not change according to the luminance level and the case where the amplitude of the AC characteristics changes according to the luminance level.

Fourth Embodiment

Figure 6:
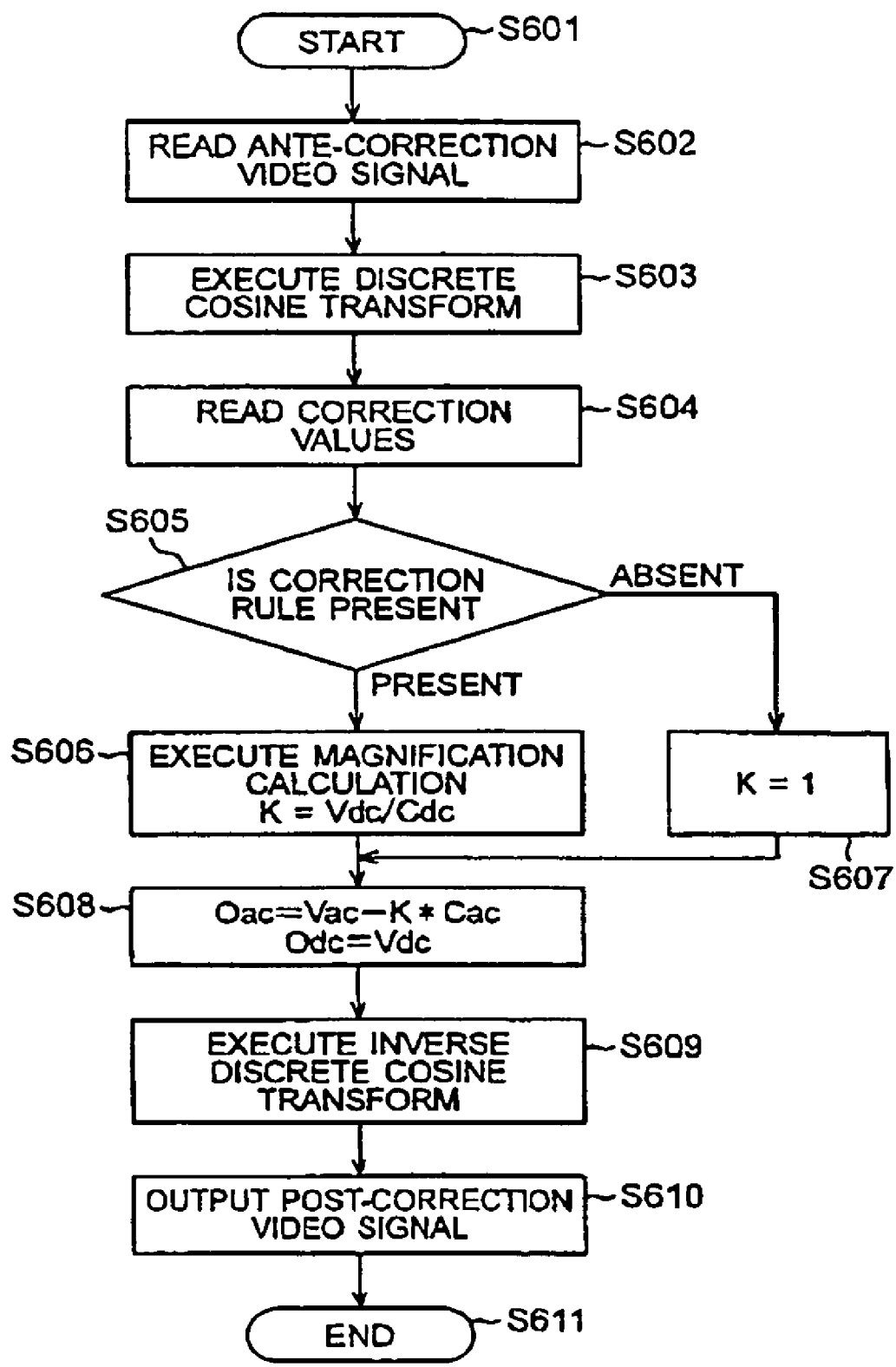
FIG. 6 is a flow chart showing software of correction processing conducted in a display apparatus according to a fourth embodiment.

FIG. 6 is a flow chart in the case where correction processing in a display apparatus according to a fourth embodiment is executed by using software. The case where the correction processing is executed by using software will now be described with reference to FIG. 2. The whole hardware configuration used to execute the correction processing is the same as that in the first embodiment. Since the correction processing is executed by the hardware portion used in the third embodiment and shown in FIG. 5, description of the hardware will be omitted.

In FIG. 6, S601 denotes processing start. S602 denotes a process for reading an ante-correction video signal. S603 denotes a process for performing discrete cosine transform (DCT). S604 denotes a process for reading a correction value. S605 denotes a process for determining whether a correction rule is present. S606 denotes a process for calculating a magnification in the case where a correction rule is present. S607 denotes a process for specifying the magnification in the case where a correction rule is not present. S608 denotes a correction calculation process. S609 denotes a process for executing inverse discrete cosine transform (IDCT) on a post-correction video signal toward the pixel space. S610 denotes a process for outputting the post-correction video signal to the display device 5. S611 denotes processing end.

The flow of the processing shown in FIG. 6 will now be described. The processing is started at S601. If an ante-correction video signal is input, the ante-correction video signal is read at S602. Immediately at S603, the ante-correction video signal is transformed to ante-correction spatial frequency information by the DCT unit 1.

On the other hand, a correction value for correction is read from the storage device 6 at S604.

As for the correction rule, it is determined at S605 whether a rule is present. If a rule is present, magnification calculation is executed according to S606. If a rule is not present, K=1 is set according to S607. The method of S605 to S607 is the method according to the third embodiment.

At S608, correction calculation is actually executed. The correction calculation is executed in the same way as the third embodiment. As a result, an AC component Oac=Vac−K(r)× Cac and a DC component Odc=Vdc are output. The AC component Oac and the DC component Odc are combined to form post-correction spatial frequency information.

If the correction calculation is completed, inverse transform of the post-correction spatial frequency information to the pixel space is executed at S609. Subsequently, the resultant post-correction video signal is output to the display device 5 at S610. At S611, all processes are completed.

As heretofore described with reference to FIG. 6, the correction processing can be concretely executed in software by using the hardware shown in FIGS. 1 and 5.

Fifth Embodiment

Figure 7:
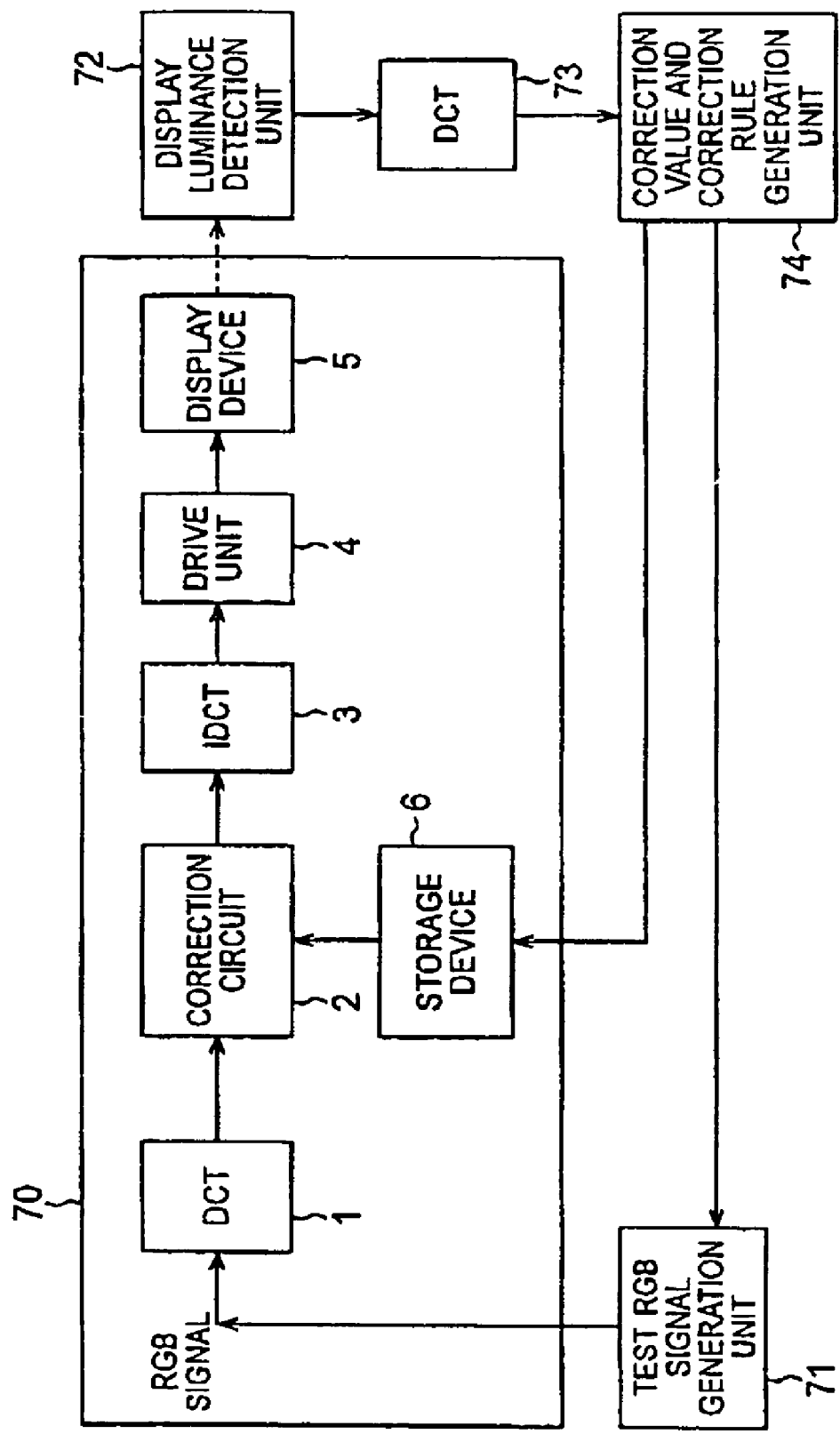
FIG. 7 is a block diagram showing an apparatus for generating predetermined correction values and correction rule in a display apparatus according to a fifth embodiment.

FIG. 7 is a configuration diagram of an apparatus for generating predetermined correction values and correction rule in a display apparatus according to a fifth embodiment. The case where correction values and a correction rule are generated will now be described with reference to FIG. 7.

In FIG. 7, numeral 70 denotes a display apparatus, 71 denotes a test RGB signal generation unit, 72 denotes a display luminance detection unit (detector), 73 denotes a DCT unit (orthogonal transform device), and 74 denotes a correction value and correction rule generation unit.

Operation in the present embodiment will now be described with reference to FIG. 7. The display apparatus 70 is the display apparatus already described with reference to the first embodiment, and consequently its description will be omitted.

First, a fixed pixel display device 5 is fabricated by using a well-known fabrication method. Various drive circuits and correction circuits are attached to a large number of fabricated display devices 5 to fabricate display apparatuses 70 shown in FIG. 7. A video signal is input to arbitrary one of the fabricated display apparatuses 70 by the test RGB signal generation unit 71.

As for the test signal, a whole white signal for bringing all pixels into the white (bright) state is typical, but the test signal is not limited to this. If the ideal display characteristics of the display panel are such characteristics that the central part of the screen is relatively bright and the top and bottom ends and the left and right ends become relatively dark, a test signal including a high luminance video signal in the central part and a low luminance video signal in the peripheral part should be used. Therefore, the state having high uniformity in display characteristics in the embodiments means a state in which variation of difference from desired display characteristics in respective pixels is very small. The state having high nonuniformity means the opposite state.

The display luminance detection unit 72 obtains luminance information issued by the display device 5 in the display apparatus 70 by optically measuring it with an image pickup element such as a CCD or electrically measuring a current emitted from the cold cathode element. In this stage, the correction signal to be used in the correction circuit 2 is not determined, and measurement is performed in a state in which the display device 5 is driven by a signal for which correction in the correction circuit 2 is not conducted.

The DCT unit 73 transforms the luminance information supplied from the display luminance detection unit 72 to a spatial frequency signal by using the discrete cosine transform, and sends the resultant spatial frequency signal to the correction value and correction rule generation unit 74. The DCT unit 73 performs orthogonal transform equivalent to that performed in the DCT unit 1, by, for example, setting a block (for example, a block formed of 8 by 8 pixels) in the discrete cosine transform equivalent to the block in the discrete cosine transform performed in the DCT unit 1.

The correction value and correction rule generation unit 74 calculates correction values and a correction rule peculiar to the display apparatus 70, and writes and stores the values in the storage device 6 in the display apparatus 70. The concrete embodiment of the correction values and correction rule are similar to those of the third embodiment already described, and consequently its description will be omitted.

The storage device 6 includes a nonvolatile memory such as a flash memory and a volatile memory such as a DRAM. The correction values and correction rule are written into the nonvolatile memory, which does not need the storage retaining operation. At the time of correction, they are read out and stored in the volatile memory, and correction can be performed by using them.

As heretofore described with reference to FIG. 7, it is possible to write the correction values and correction rule into the display apparatus 70, and perform individual correction every display apparatus 70.

In the embodiments heretofore described, the input video signal is subjected to discrete cosine transform in the DCT unit and the ante-correction spatial frequency information is corrected. However, if the input signal is an originally orthogonal-transformed spatial frequency signal, such as a signal transmitted as a digital television broadcast signal, an MPEG signal obtained by receiving a signal transmitted from a server on the Internet, or an MPEG signal readout from a recording medium such as a DVD, then the discrete cosine transform before the correction is not necessary, and the input spatial frequency signal can be directly corrected.

Figure 8:
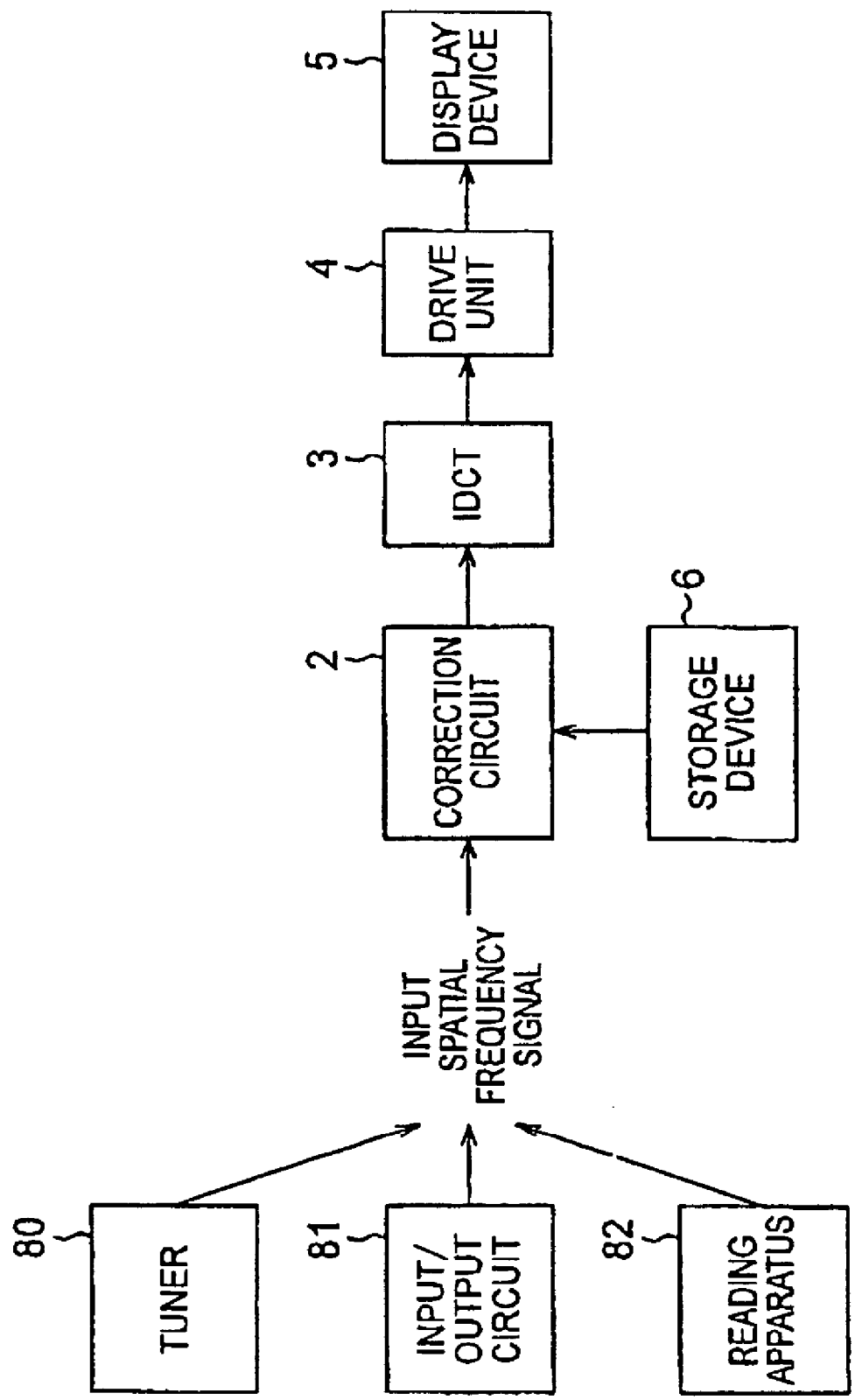
FIG. 8 is a block diagram showing a display apparatus according to another example of the embodiments.

The case where correction is conducted directly on the input signal (input spatial frequency signal) is shown as in FIG. 8. In the configuration of the display apparatus shown in FIG. 8, the DCT unit (orthogonal transform device) is not provided. An input spatial frequency signal supplied from a digital television broadcast signal tuner 80, an input/output circuit connected to the Internet, or a recording medium reading apparatus 82 such as a DVD is input to the correction circuit 2. Correction is performed so as to cancel the display faults such as display defects and display unevenness. And post-correction spatial frequency information is output. The correction method is executed in the same way as the embodiments. The post-correction spatial frequency information is input to the IDCT unit 3, and subjected to inverse discrete cosine transform. A resultant post-correction video signal is output. Thereafter, pixels on the display device 5 are driven by the drive unit 4 on the basis of the post-correction video signal, and display is displayed on the display device 5.

Also in the case of the display apparatus shown in FIG. 8, display fault characteristics which differ every display device 5 can be corrected individually, and an effect of high picture quality can be obtained.

Even if the input signal is an orthogonal-transformed signal, or the orthogonal transform is not equivalent to the orthogonal transform conducted on the measured result of the nonuniformity in the display characteristics in order to obtain the correction values, the present invention can be executed. In that case, a signal input in a state in which it has been subjected to orthogonal transform should be subjected to inverse orthogonal transform, and orthogonal transform equivalent to the orthogonal transform executed to obtain the correction values should be executed on the signal subjected to the inverse orthogonal transform, and thereafter correction should be performed.

In the embodiments heretofore described, discrete cosine transform has been executed as the orthogonal transform. However, the orthogonal transform is not limited to the discrete cosine transform, but various orthogonal transforms such as the discrete wavelet transform can be adopted.

What is claimed is:

1. A signal processing method for processing a signal obtained by performing orthogonal transform on an inputted video signal corresponding to a plurality of pixels, said signal processing method comprising:

a storing process for measuring brightness of each pixel of a display device while supplying a test video signal having a uniform luminance level to the display device, performing orthogonal transform equivalent to the orthogonal transform performed on the inputted video signal on the measured values obtained by measuring non-uniformity of display characteristics of the display device, and storing the orthogonally transformed measured values as correction values;

a correction process for correcting the orthogonally transformed signal, by using the stored correction values; and an inverse orthogonal transform process for performing inverse orthogonal transform on the signal corrected in said correction process and thereby obtaining a corrected video signal, wherein in the correction process a DC component of the correction values is divided by a DC component of the orthogonally transformed signal to calculate a coefficient and an AC component of the correction values is multiplied by the calculated coefficient, and wherein the correction process corrects the orthogonally transformed signal by subtracting the multiplied value from the orthogonally transformed signal.

2. A signal processing method according to claim 1, wherein in the correction process it is determined whether or not to perform the adjustment of the correction value for respective pixels based on a correction rule that describes which pixel the adjustment correction value is applied to.

3. A signal processing apparatus comprising:

an orthogonal transform device for performing orthogonal transform on a video signal corresponding to a plurality of pixels;

a storage device for storing correction values obtained by performing orthogonal transform equivalent to the orthogonal transform of the orthogonal transform device on values obtained by measuring non-uniformity of display characteristics of a display device, the measurement of the non-uniformity is performed by measuring brightness of each pixel of the display device while supplying a test video signal having a uniform luminance level to the display device;

a correction circuit for correcting the signal transformed by said orthogonal transform device by using correction values stored in said storage device; and an inverse orthogonal transform device for performing inverse orthogonal transform on the signal corrected by said correction circuit and thereby obtaining a corrected video signal, wherein the correction circuit includes a magnifier unit that divides a DC component of the correction values by a DC component of the orthogonally transformed signal to calculate a coefficient and multiplies an AC component of the correction values by the calculated coefficient, and wherein the correction circuit performs the correction of the orthogonally transformed signal by subtracting the multiplied value from the orthogonally transformed signal.

4. A signal processing apparatus according to claim 1, wherein the correction circuit performs the correction of the signal by subtracting an AC component of the correction values from the orthogonally transformed signal.

5. A signal processing apparatus according to claim 3, wherein said storage device stores a correction rule that describes which pixel the adjustment of the correction value is applied to, and wherein said correction circuit determines whether or not to perform the adjustment of the correction value for respective pixels based on the rule stored in said storage device.

* * * * *